(12) United States Patent
Rovik et al.

(10) Patent No.: US 9,778,054 B2
(45) Date of Patent: Oct. 3, 2017

(54) VEHICLE NAVIGATION SYSTEMS AND METHODS FOR PRESENTING DRIVING DIRECTIONS ON FAMILIAR ROUTES

(71) Applicant: Toyota Motor Engineering & Manufacturing North America, Inc., Erlanger, KY (US)

(72) Inventors: Christopher Lee Rovik, Northville, MI (US); Eric Randell Schmidt, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/931,244

(22) Filed: Nov. 3, 2015

(65) Prior Publication Data

US 2017/0122758 A1    May 4, 2017

(51) Int. Cl.
*G01C 21/34* (2006.01)
*G01C 21/36* (2006.01)
*G01S 19/42* (2010.01)

(52) U.S. Cl.
CPC ..... *G01C 21/3484* (2013.01); *G01C 21/3629* (2013.01); *G01C 21/3691* (2013.01); *G01S 19/42* (2013.01)

(58) Field of Classification Search
CPC ............ G01C 21/3484; G01C 21/3629; G01C 21/36; G01C 21/3407; G01C 21/3641; G01C 21/343; G01C 21/3621; G08G 1/096827; H04M 11/066; B60W 50/08
See application file for complete search history.

(56) References Cited

U.S. PATENT DOCUMENTS

| 7,512,487 | B1 | 3/2009 | Golding et al. |
| 8,700,320 | B1* | 4/2014 | Teicher ............... G01C 21/343 340/995.24 |
| 9,086,294 | B2 | 7/2015 | Geelen et al. |
| 9,091,557 | B2 | 7/2015 | Weir et al. |
| 9,273,978 | B2* | 3/2016 | Walker ............... G01C 21/3629 |

(Continued)

FOREIGN PATENT DOCUMENTS

| EP | 2466260 A1 | 6/2012 |
| WO | 2010/053927 A1 | 5/2010 |

(Continued)

*Primary Examiner* — Yuri Kan
(74) *Attorney, Agent, or Firm* — Dinsmore & Shohl LLP

(57) ABSTRACT

A vehicle navigation system for a vehicle that does not provide driving instructions or information to a driver when the driver is traveling along a familiar route, but does provide audible driving instructions or information when a route deviation event includes one or more processors, a vehicle navigation system display, one or more audio speakers, a satellite module, and a non-transitory computer-readable medium storing computer-executable instructions. The one or more processors are configured to determine if the vehicle navigation system is on a familiar route and execute a Reduced Audible Mode, automatically, when the route is familiar. In addition, the one or more processors are operable to switch the vehicle navigation system from the Reduced Audible Mode to a Full Audible Mode when a route deviation event is detected.

19 Claims, 5 Drawing Sheets

(56) References Cited

U.S. PATENT DOCUMENTS

| | | | |
|---|---|---|---|
| 2006/0069500 A1* | 3/2006 | Hashizume | G08G 1/096827 701/410 |
| 2011/0217957 A1* | 9/2011 | Macdonald | H04M 11/066 455/414.1 |
| 2015/0106012 A1* | 4/2015 | Kandangath | G01C 21/3641 701/428 |
| 2015/0192426 A1* | 7/2015 | Foster | G01C 21/3629 715/765 |
| 2015/0253146 A1* | 9/2015 | Annapureddy | G01C 21/36 701/490 |
| 2016/0084666 A1* | 3/2016 | Dzyuba | G01C 21/3407 701/414 |

FOREIGN PATENT DOCUMENTS

| | | | | |
|---|---|---|---|---|
| WO | WO-2010052236 A1 * | 5/2010 | | B60W 50/08 |
| WO | 2011/059421 A1 | 5/2011 | | |

\* cited by examiner

VEHICLE NAVIGATION SYSTEMS AND METHODS FOR PRESENTING DRIVING DIRECTIONS ON FAMILIAR ROUTES

TECHNICAL FIELD

The present specification generally relates to vehicle navigation systems and, more specifically, to vehicle navigation systems configured to selectively provide driving information on routes that are familiar to a driver.

BACKGROUND

Vehicle navigation systems are used in vehicles to present information to a driver and/or passenger of a vehicle. Such information may include geographic information, such as a map of roads that are in proximity to the vehicle. Other information may be audible information provided to the driver and/or passenger related to approaching turns or exits that must be taken to continue on a predetermined route.

The audible instructions are provided when approaching a turn or exit that should be taken by the driver. However, the audible instructions are not always desired when the driver is on a route that is known to the driver and/or a route that does require a turn, exit, etc. for an extended distance. In these instances, it may be common for the driver to deactivate the vehicle navigation system. However, the driver may still desire to be alerted when there is traffic congestion on the route, road construction on the route, a traffic accident on the route, and the like. Accordingly, a need exists for alternative vehicle navigation systems that do not necessarily provide driving information to a driver and/or passenger of a vehicle when the driver is traveling on a "familiar route," but do alert the driver and/or passenger when traffic congestion, construction, an accident, etc. is present on the familiar route.

SUMMARY

In one embodiment, a vehicle navigation system includes one or more processors, a vehicle navigation system display communicatively coupled to the one or more processors, one or more audio speakers communicatively coupled to the one or more processors, a satellite module communicatively coupled to the one or more processors and configured to provide geographic location data to the one or more processors, and a non-transitory computer-readable medium storing computer-executable instructions. When the computer-executable instructions are executed by the one or more processors, the vehicle navigation system is configured to determine a route between a start location and a destination location and determine if the route is a familiar route or not a familiar route. The one or more processors can present a map image on the vehicle navigation system display, the map image being indicative of the route. The one or more processors can receive the geographic location data from the satellite module and the geographic location data is indicative of a geographic location of the vehicle associated with the vehicle navigation system. The one or more processors can execute a Reduced Audible Mode, automatically, when the route is determined to be a familiar route, and the Reduced Audible Mode is configured to provide audible driving information at a preset first volume. The one or more processors can also execute a Full Audible Mode, automatically, when the route is determined not to be a familiar route, the Full Audible Mode configured to provide audible driving information at a preset second volume, the second volume being greater than the first volume. The one or more processors can also execute a switch from the Reduced Audible Mode to the Full Audible Mode, automatically, when the Reduced Audible Mode is being executed and a route deviation event is detected. The computer-executable instructions can cause the vehicle navigation system to detect the route deviation event. For example, the route deviation event can be a determination that the geographic location data received from the satellite module, and thus the geographic location of the vehicle, corresponds to a geographic location that is not on the familiar route. The route deviation event can also be a traffic incident event and/or a traffic flow event on the familiar route. The traffic incident event can be a traffic accident event on the familiar route and/or a road construction event on the familiar route. The traffic flow event can be a determination that an average speed of vehicles currently travelling at one or more sections of the familiar route is below a predetermined value.

According to another embodiment, a method of providing audible information to a driver of a vehicle includes providing a vehicle navigation system associated with the vehicle and providing a start location and a destination location to the vehicle navigation system. The vehicle navigation system determines a route between the start location and the destination location, and also determines if the route is a familiar route. The vehicle navigation system presents a map image on a vehicle navigation system display, the map image being indicative of the route. The vehicle navigation system also receives geographic location data indicative of a geographic location of the vehicle from a satellite module. The vehicle navigation system can execute a Reduced Audible Mode, automatically, when the route is determined to be a familiar route and the Reduced Audible Mode provides audible driving information to the driver at a preset first volume. The vehicle navigation system can execute a Full Audible Mode, automatically, when the route is determined not to be a familiar route and the Full Audible Mode provides audible driving information to the driver at a preset second volume that is greater than the preset first volume. The vehicle navigation system can execute a switch from the Reduced Audible Mode to the Full Audible Mode, automatically, when the Reduced Audible Mode is presently being executed and a route deviation event is detected by the vehicle navigation system. The route deviation event can be an unexpected route event, an incident event, and/or a traffic flow event. The unexpected route event is a determination by the vehicle navigation system that the current geographic location of the vehicle navigation system is not a location on the familiar route, i.e. the vehicle is no longer on the familiar route. The incident event can be a traffic accident event and/or a road construction event on the familiar route. The traffic flow event can be indicative of congested traffic, i.e. a determination that an average speed of vehicles currently traveling at one or more sections of the familiar route is below a predetermined value. In this manner, the present specification discloses apparatuses and methods that allow a driver of a vehicle to travel along a familiar route without having to listen to audible driving information that is not needed, but be alerted when a route deviation event has occurred on the familiar route.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 3:
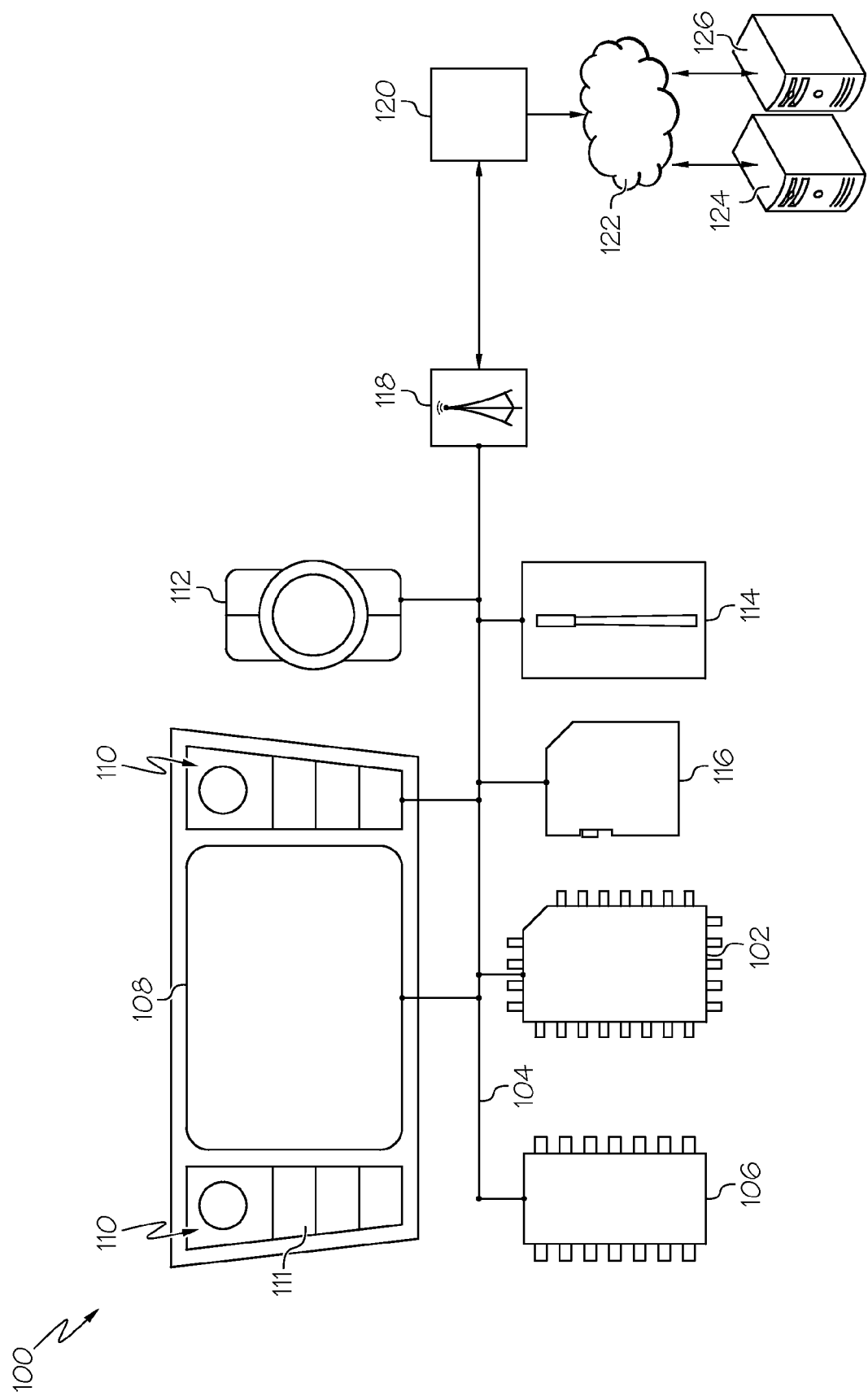
FIG. 3 schematically depicts a vehicle navigation system according to one or more embodiments described and illustrated herein.

FIG. 3 generally depicts one embodiment of a vehicle navigation system with one or more processors, one or more memory modules, a vehicle navigation system display (display), one or more audio speakers, and a satellite module. The vehicle navigation system can be communicatively coupled with one or more geographical positioning satellites and one or more traffic data suppliers. A driver of the vehicle can provide a starting location and a destination location to the vehicle navigation system and the one or more processors can provide a route between the starting location and the destination location, and a map on the display that is indicative of at least a portion of the route. The one or more processors can also provide audible driving information using the one or more speakers. The one or more processors can determine if the route is a familiar route. For the purpose of the instant specification, a "familiar route" is defined as a route provided by the vehicle navigation system of which at least a portion of the route the driver of the vehicle does not need or desire driving information related to the route. Examples of a familiar route include but are not limited to "local" routes such as relatively short distance commutes to and from work, driving to and from familiar locations such as a grocery store, a shopping mall, a church, a sporting event site, etc., and "extended" routes such as relatively long distance travel on a single highway with a low number of complications, e.g. an interstate to a relatively remote location. Also, an "unfamiliar route" is defined as a route provided by the vehicle navigation system of which at least a portion of the route the driver of the vehicle does need or desire driving information related to the route. It should be appreciated that an unfamiliar route can be either a local route or an extended route.

If the one or more processors determine the route to be a familiar route (or the driver designates the selected route as a familiar one), the one or more processors can execute a Reduced Audible Mode such that driving information is provided to the driver at a reduced volume and/or at no volume. In this manner, the driver can drive along the familiar route without being presented with audible driving instructions from the vehicle navigation system, or in the alternative, be presented with audible driving instructions at a reduced volume. However, in the event that a route deviation event is detected by the one or more processors, the one or more processors can automatically switch the vehicle navigation system from the Reduced Audible Mode to a Full Audible Mode which provides audible driving information to the driver at a second volume that is greater than the first volume (e.g., at a non-zero volume level that can be heard by the driver). Such a route deviation event can be the result of the vehicle no longer traveling on the familiar route, e.g. the driver has made a wrong turn. A route deviation event can also be the result of traffic data supplied by the one or more traffic data suppliers, the traffic data being indicative of a traffic accident event that has occurred on the familiar route, road construction on the familiar route, or congested traffic on the familiar route.

Figure 1:
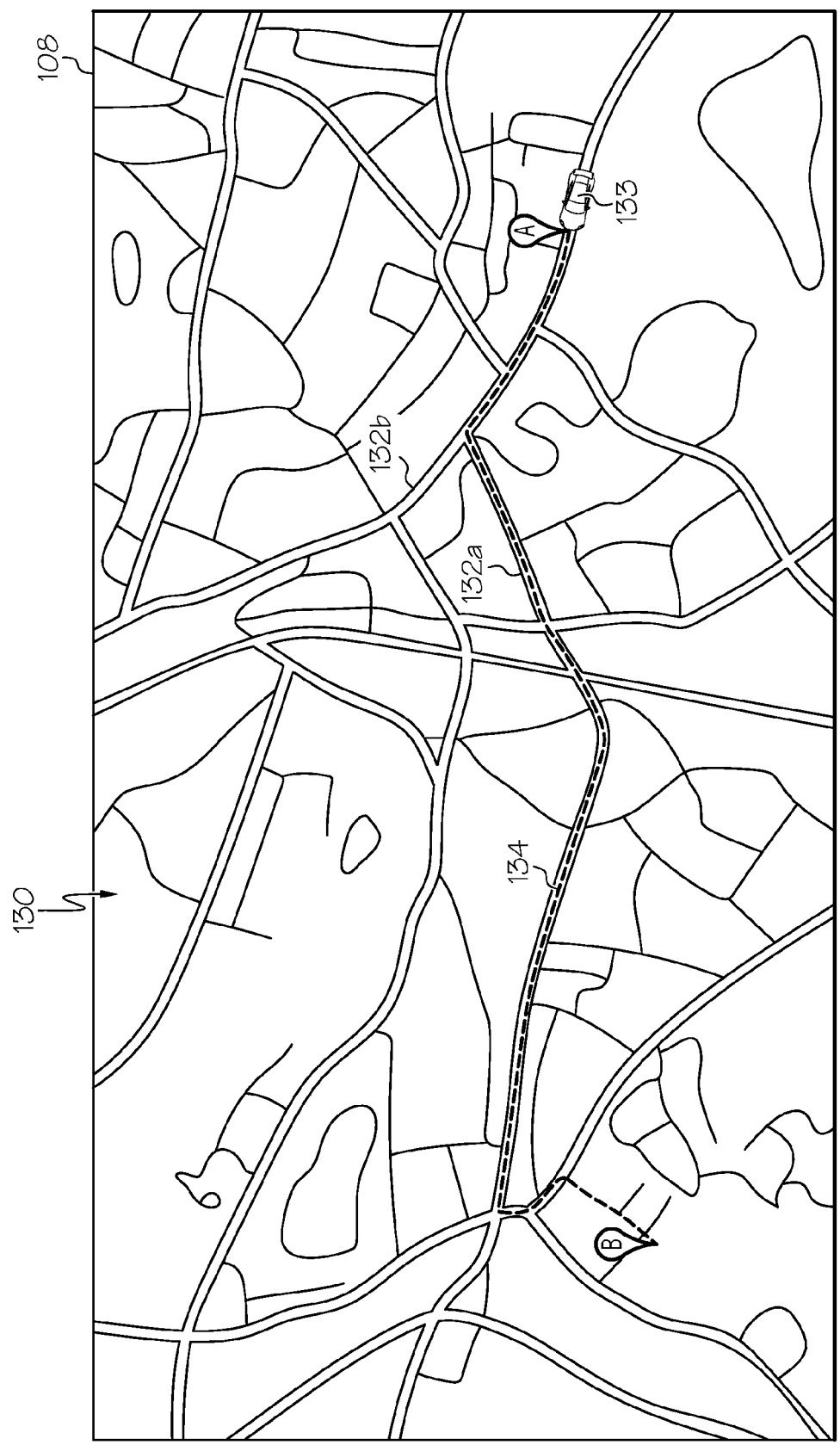
FIG. 1 schematically depicts a map provided on a display of a vehicle navigation system wherein the map illustrates a local route between a start location A and a destination location B.
Figure 2:
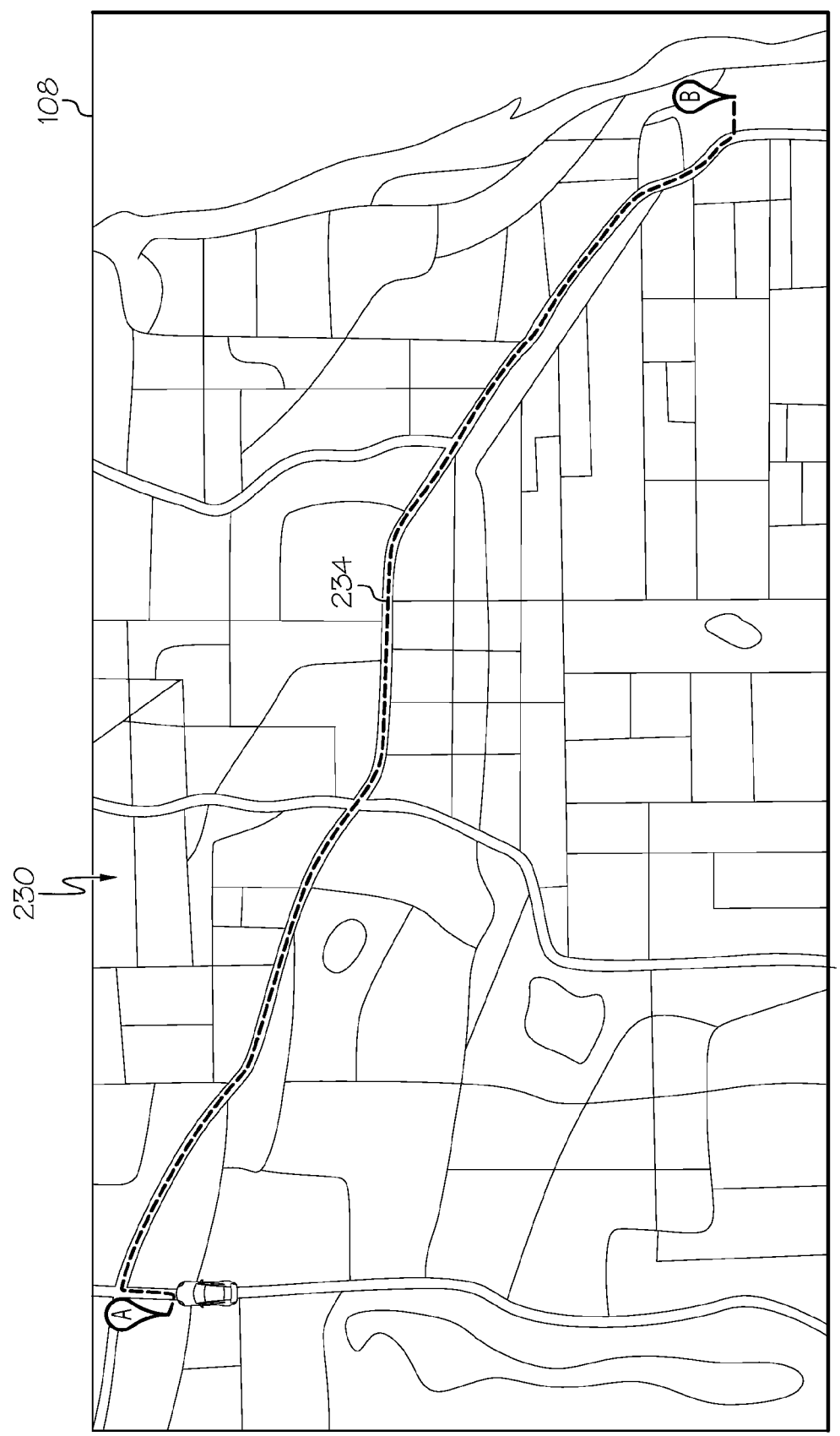
FIG. 2 schematically depicts a map provided on a display of a vehicle navigation system wherein the map illustrates an extended route, e.g. on an interstate, between a start location A and a destination location B.

Referring now to FIG. 1, a schematic illustration of a map 130 on a vehicle navigation system display (display) 108 is shown with a route 134 between a starting location A and a destination location B. The route 134 includes a first road 132a intersecting with a second road 132b. The route 134 is a local route to a driver of a vehicle 133 illustratively shown on the map 130 and driving information is typically not needed by the driver when driving from staring location A to destination location B, and vice-versa. For example, the route 134 may be commonly travelled by the driver of the vehicle 133 a predetermined number of times, designated by the driver as a familiar route and/or determined by the vehicle navigation system to be a familiar route based on preselected criteria (e.g., distance, number of turns, lack of construction or other complications). Referring to FIG. 2, a schematic illustration of a map 230 on the vehicle navigation system display 108 illustrates a route 234 between a starting location A and a destination location B. The route 234 illustrates an extended route traveling on which the driver of the vehicle 133 to drive can drive an extended time period without needing driving information from the vehicle navigation system. For example, the route 234 may be commonly travelled by the driver of the vehicle 133 a predetermined number of times, designated by the driver as a familiar route and/or determined by the vehicle navigation system to be a familiar route based on preselected criteria (e.g., distance, number of turns, lack of construction or other complications).

Referring now to FIG. 3, an embodiment of a vehicle navigation system 100 is schematically depicted. It is known that while the vehicle navigation system 100 is depicted in isolation, the vehicle navigation system 100 may be coupled to a vehicle (e.g., vehicle 133 of FIGS. 1 and 2). The vehicle may be an automobile or any other passenger or non-passenger vehicle such as, for example, a terrestrial, aquatic, and/or airborne vehicle. Although the navigation system is referred to herein as a vehicle navigation system, it should be understood that in some embodiments the navigation system may not be associated with a vehicle, such as handheld global positioning system (GPS) units.

The vehicle navigation system 100 may include one or more processors 102. Each of the one or more processors 102 can be any device capable of executing computer-executable instructions. Accordingly, each of the one or more processors 102 may be a controller, an integrated circuit, a microchip, a computer, or any other computing device. The one or more processors 102 can be coupled to a communication path 104 that provides signal interconnectivity between various modules of the vehicle navigation system 100. Accordingly, the communication path 104 can communicatively couple any number of processors with one another, and allow the modules of the vehicle navigation system 100 coupled to the communication path 104 to operate in a distributed computing environment. Specifically, each of the modules can operate as a node that may send and/or receive data. As used herein, the term "communicatively coupled" means that coupled components are capable of exchanging data signals with one another such as, for example, electrical signals via conductive medium, over-the-air electromagnetic signals, optical signals via optical waveguides, and the like.

Accordingly, the communication path 104 can be formed from any medium that is capable of transmitting a signal such as, for example, conductive wires, conductive traces, optical waveguides, or the like. Moreover, the communication path 104 can be formed from a combination of mediums capable of transmitting signals. In one embodiment, the communication path 104 can comprise a combination of conductive traces, conductive wires, connectors, and buses that cooperate to permit the transmission of electrical data signals to components such as processors, memories, sensors, input devices, output devices, and communication devices. Accordingly, the communication path 104 can comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle navigation system 100 may include one or more memory modules 106 coupled to the communication path 104. The one or more memory modules 106 may be configured as RAM, ROM, flash memories, hard drives, and/or any device capable of storing computer-executable instructions such that the computer-executable instructions can be accessed by the one or more processors 102. The computer-executable instructions can comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into computer-executable instructions and stored on the one or more memory modules 106. Alternatively, the computer-executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, the vehicle navigation system 100 comprises a display 108 for providing visual output such as, for example, maps, navigation, entertainment, information, or combinations thereof. The display 108 can be coupled to the communication path 104. Accordingly, the communication path 104 can communicatively couple the display 108 to other modules of the vehicle navigation system 100. The display 108 can include any medium capable of transmitting an optical output such as, for example, a cathode ray tube, light emitting diodes, a liquid crystal display, a plasma display, or the like. Moreover, the display 108 can be a touch screen that, in addition to providing optical information, detects the presence and location of a tactile input upon a surface of or adjacent to the display. Accordingly, each display can receive mechanical input directly upon the optical output provided by the display 108. Additionally, it is noted that the display 108 can include at least one of the one or more processors 102 and the one or more memory modules 106.

In some embodiments, the vehicle navigation system 100 may also comprise tactile input hardware 110 coupled to the communication path 104 such that the communication path 104 communicatively couples the tactile input hardware 110 to other modules of the vehicle navigation system 100. The tactile input hardware 110 can be any device capable of transforming mechanical, optical, or electrical signals into a data signal capable of being transmitted with the communication path 104. Specifically, the tactile input hardware 110 can include any number of movable objects that each transform physical motion into a data signal that can be transmitted over the communication path 104 such as, for example, a button, a switch, a knob, a microphone or the like. In some embodiments, the display 108 and the tactile input hardware 110 can be combined as a single module and operate as an audio head unit or an infotainment system of a vehicle. However, it is noted, that the display 108 and the tactile input hardware 110 can be separate from one another and operate as a single module by exchanging signals via the communication path 104.

The vehicle navigation system 100 may also include a peripheral tactile input 112 coupled to the communication path 104 such that the communication path 104 communicatively couples the peripheral tactile input 112 to other modules of the vehicle navigation system 100. For example, in one embodiment, the peripheral tactile input 112 can be located in a vehicle console to provide additional location for receiving input. The peripheral tactile input 112 operates in a manner substantially similar to the tactile input hardware 110, i.e., the peripheral tactile input 112 includes movable objects and transforms motion of the movable objects into a data signal that can be transmitted over the communication path 104. For example, the peripheral tactile input 112 may be configured as a moveable joystick or knob.

The vehicle navigation system 100 further includes a satellite module 114 coupled to the communication path 104 such that the communication path 104 communicatively couples the satellite module 114 to other modules of the vehicle navigation system 100. The satellite module 114 is configured to receive signals from global positioning system satellites. Specifically, in one embodiment, the satellite module 114 can include one or more conductive elements acting as an antenna that interact with electromagnetic signals transmitted by global positioning system satellites. The received signal can be transformed into a data signal indicative of the location (e.g., latitude and longitude) of the satellite module 114 or an object positioned near the satellite module 114, by the one or more processors 102. The received signal can be transformed that corresponds to the location (e.g., latitude and longitude) of the satellite module 114. Additionally, it is noted that the satellite module 114 can include at least one of the one or more processors 102 and the one or more memory modules 106.

In embodiments where the vehicle navigation system 100 is coupled to a vehicle, the one or more processors 102 can execute computer-executable instructions to transform the signals received by the satellite module 114 into data indicative of the positioning of the vehicle with respect to road data, i.e., the vehicle position can be indicated on a map. The road data can be stored as computer-executable instructions in the one or more memory modules 106. Alternatively or additionally, road data can be stored on a removable data module 116. Specifically, the removable data module 116 can be coupled to the communication path 104 via a socket with a movable member. The movable member can transition between states that apply varying amounts of force to the removable data module 116. Accordingly, the removable data module 116 can be optical media, solid state flash memory (e.g., USB or memory card), or a combination thereof.

The vehicle navigation system 100 can include network interface hardware 118 for communicatively coupling the vehicle navigation system 100 with one or more traffic data suppliers 120. The network interface hardware 118 can be coupled to the communication path 104 such that the communication path 104 communicatively couples the network interface hardware 118 to other modules of the vehicle navigation system 100. The network interface hardware 118 can be any device capable of transmitting and/or receiving data via a wireless network. Accordingly, the network interface hardware 118 can include a communication transceiver for sending and/or receiving data according to any wireless communication standard. For example, the network interface hardware 118 may include a chipset (e.g., antenna, processors, computer-executable instructions, etc.) to communicate over wireless computer networks such as, for example, wireless fidelity (Wi-Fi), WiMax, Bluetooth, IrDA, Wireless USB, Z-Wave, ZigBee, or the like.

The one or more traffic data suppliers 120 can collect data from road sensors, local departments of transportation, data collected from operators of large fleets of vehicles, and other manual sources such as traffic helicopters and listening to police scanners. The traffic data can be collected, stored and/or retrieved from the "cloud" 122 and/or one or more servers 124, 126 which are communicatively coupled with the one or more traffic data suppliers 120. It is appreciated that the traffic data from the one or more traffic data suppliers 120 can be delivered to the vehicle navigation system 100 through the network interface hardware 118 and a wireless data system, e.g. MSN Direct. Such delivery of traffic data is collected by the one or more traffic data suppliers 120 and sent over wireless airwaves to a receiver that is part of the satellite module 114 or added as an external antenna (not shown). The one or more traffic data suppliers 120 can also provide traffic data via a "silent" transmission over FM radio. The traffic data can be received by an FM antenna that is part of the satellite module 114 or be part of an external antenna (not shown). The traffic data can also be delivered by the one or more traffic data suppliers 120 utilizing a data connection of a mobile device such as a mobile phone. The mobile phone can connect to the Internet 122 over the phone's cellular connection and download the traffic data. Then, the traffic data can be sent to the vehicle navigation system 100 via a wireless network such as, for example, wireless fidelity (Wi-Fi), WiMax, Bluetooth, IrDA, Wireless USB, Z-Wave, ZigBee, or the like, or in the alternative, via a wired connection from the mobile phone to the vehicle navigation system 100.

Figure 4:
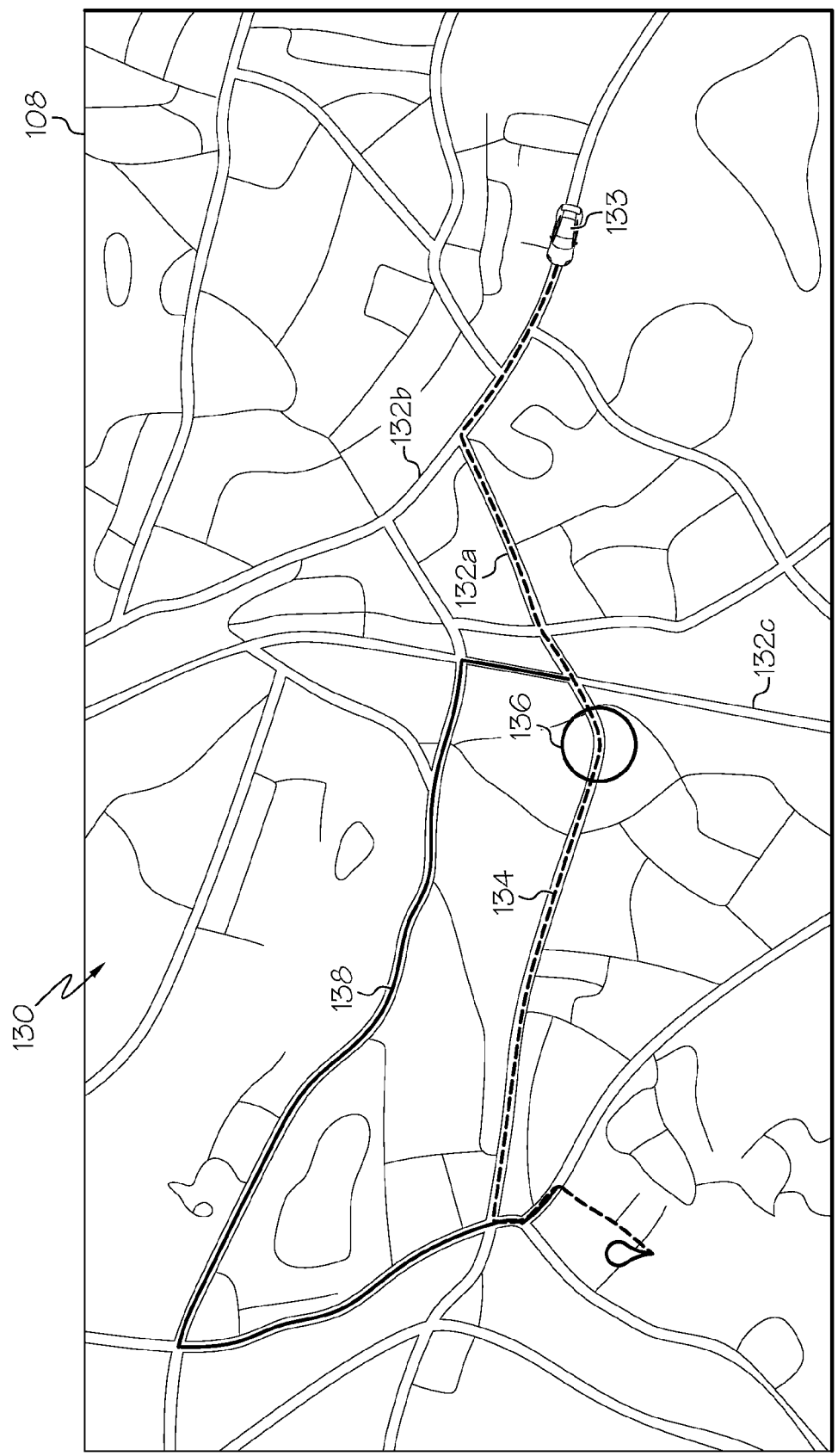
FIG. 4 schematically depicts the map shown in FIG. 1 with a route deviation event present on the local route.

Referring now to FIG. 4, the map 130 shown in FIG. 1 is schematically shown with a route deviation event 136 on the familiar route 134. While traveling on the familiar route 134, a vehicle navigation system 100 according to one or more embodiments disclosed herein, can be a Reduced Audible Mode. However, upon detection of the route deviation event 136, the vehicle navigation system 100 automatically switches from the Reduced Audible Mode to a Full Audible Mode in order to alert the driver of the route deviation event 136 unless a manual override to keep the vehicle navigation system 100 in the Reduced Audible Mode is presently activated. A manual override to require the vehicle navigation system 100 to stay in the Reduced Audible Mode or the Full Audible Mode can be manually input by a user of the vehicle navigation system 100, e.g. using the tactile input hardware 110. The Reduced Audible Mode provides driving information at a first volume, for example a volume of less 20 decibels (dB), in some instances less than 10 dB, in other instances less than zero (0) dB, and in still other instances no volume. The Full Audible Mode provides driving information including a route deviation event alert at a second volume which is greater than the first volume, for example a volume of greater than 40 dB, in some instances greater than 50 dB and in other instances greater than 60 dB. In addition, it is appreciated that the first volume and the second volume of the vehicle navigation system 100 can be set by the driver of the vehicle, e.g. using the tactile input hardware 110.

The route deviation event 136 can be an incident event or a traffic flow event. An incident event can include a traffic accident event, i.e. a traffic accident has occurred on route 134 at the location illustrated at 136. The incident event can also be a road construction event, i.e. construction on route 134 at the location represented by 136. The traffic flow event can be the result of slow traffic, i.e. an average speed of vehicles in the vicinity of the location indicated by reference numeral 136 being below a predetermined minimum average speed value stored in the one or more memory modules 106. It is appreciated that the predetermined minimum average speed value can be set by the driver or another individual in the vehicle navigation system 100. For example, the driver of the vehicle 133 can set a predetermined speed, or a predetermined fraction or percentage of a speed limit, using the tactile input hardware 110. Then if traffic data received by the vehicle navigation system 100 from the one or more traffic data suppliers 120 indicates that traffic on the familiar route 134 is moving below the speed or less than the speed limit times the fraction, the one or more processors 102 can switch the vehicle navigation system 100 from the Reduced Audible Mode to the Full Audible Mode, automatically.

The route deviation event can also be an unexpected route event in which the geographic location of the vehicle navigation system is not a location on the familiar route 134. For example, if the vehicle 133 were to fail to make a left-hand turn off of road 132b onto road 132a, i.e. the vehicle 133 continued straight onto road 132b, such a deviation from the route 134 would be an unexpected route event and the one or more processors 102 would execute a switch from the Reduced Audible Mode to the Full Audible Mode, automatically. It is also appreciated that the vehicle navigation system 100 can supply an alternative route 138 that bypasses the route deviation event 136 in order to arrive at the destination location B.

Figure 5:
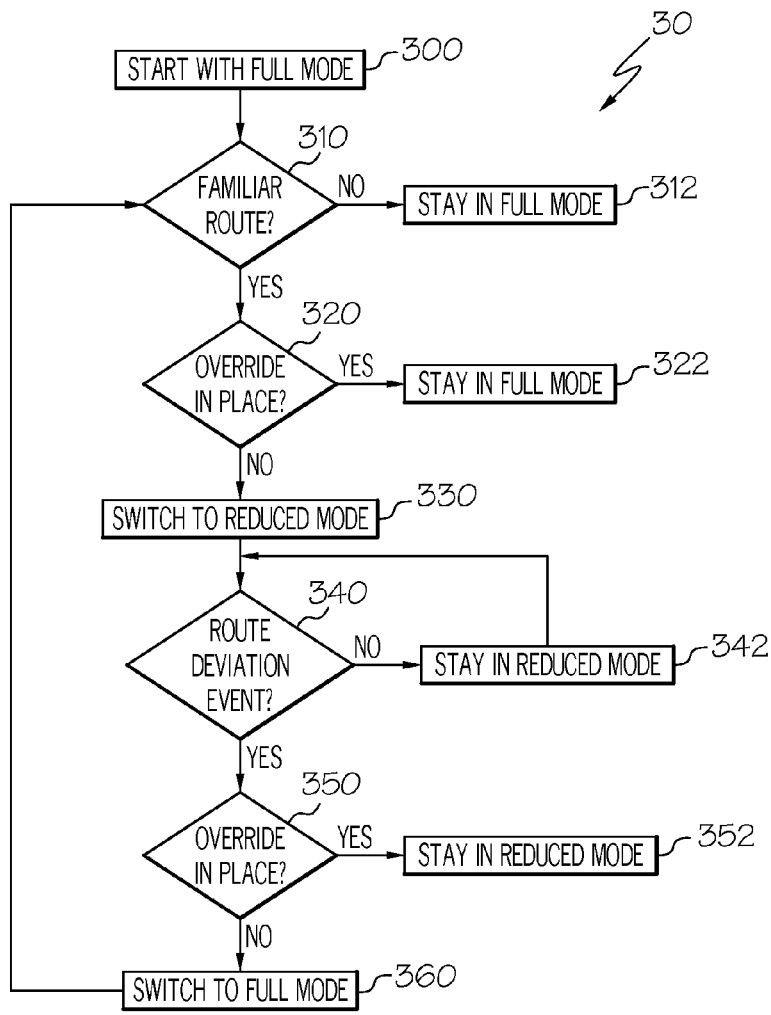
FIG. 5 schematically depicts a method for providing audible information to a driver of a vehicle associated with a vehicle navigation system according to one or more embodiments described and illustrated herein.

Referring now to FIG. 5, an illustrative method for providing driving information using the vehicle navigation system 100 according to one or more embodiments disclosed herein is provided at reference numeral 30. The method 30 includes starting the vehicle navigation system 100 in the Full Audible Mode at step 300 and the vehicle navigation system 100 determining whether or not the vehicle associated with the vehicle navigation system is traveling a familiar route. The determination of whether or not the route provided by the one or more processors 102 is a familiar route can be the result of a manual input by the driver into the vehicle navigation system 100, e.g. using the tactile input hardware 110, or the result of the one or more processors executing computer-executable instructions stored in the one or more memory modules 106. For example, the driver or a passenger of the vehicle 133 can manually instruct the vehicle navigation system 100 using the tactile input hardware 110 that the route is a familiar route. In the alternative, the one or more processors 102 can be configured to determine if the current route has been traveled more than x time, e.g. x≥5, and/or if the current route has a distance of more than y miles, e.g. y≥20, on a single highway with a low number of complications. In the event that the route is not a familiar route, the vehicle navigation system 100 stays in the Full Audible Mode as illustrated at step 312. In the alternative, if the route is a familiar route, the vehicle navigation system 100 determines whether or not the driver has an override in place in which the vehicle navigation system 100 is prevented from entering into the Reduced Audible Mode. In the event that an override is in place, the vehicle navigation systems stays in the Full Audible Mode as illustrated at step 322. In the event that the override is not in place, the vehicle navigation system 100 switches to the Reduced Audible Mode at step 330.

At step 340, the vehicle navigation system 100 determines whether or not a route deviation event has occurred. It is appreciated that the one or more processors 102 of the vehicle navigation system which are communicatively coupled with the satellite module 114 and one or more traffic data suppliers 120 can determine if a route deviation event as described above has occurred. In the event that no route deviation event has occurred at step 340, the vehicle navigation system 100 stays in the Reduced Audible Mode as illustrated at step 342. In addition, after staying in the Reduced Audible Mode at step 342, the process returns to step 340 in which the vehicle navigation system 100 continues to monitor and determine whether a route deviation event has occurred. In the event that a route deviation event has occurred at step 340, the vehicle navigation system 100 determines whether or not an override with respect to switching to the Full Audible Mode is in place at step 350. In the event that an override is in place, the process proceeds to step 352 in which the Reduced Audible Mode is maintained. In the alternative, if an override is not in place at step 350, the vehicle navigation system 100 switches back to the Full Audible Mode at step 360. The process then proceeds back to step 310 and the process continues this cycle until the vehicle navigation system has reached the final destination location.

Figure 6:
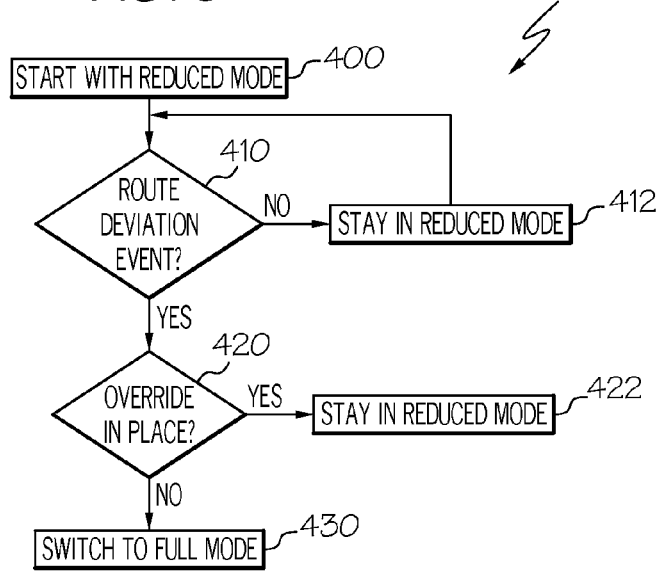
FIG. 6 schematically depicts a method for providing audible information to a driver of a vehicle associated with a vehicle navigation system according to one or more embodiments described and illustrated herein.

Referring to FIG. 6, another process for providing driving information to a driver of a vehicle is shown generally at reference numeral 40. The process 40 includes being on a route with the vehicle navigation system 100 in the Reduced Audible Mode at step 400. The route can be a familiar route or, in the alternative, the route can be an unfamiliar route. As such, the Reduced Audible Mode can be executed and currently in use due to the vehicle navigation system 100 being on a familiar route or by manual selection by a user of the vehicle navigation system 100. The process determines whether or not a route deviation event has occurred at step 410 and in the event that a route deviation event has not occurred, the process proceeds to stay in the Reduced Audible Mode at step 412. At step 412 the process returns back to step 410 and the vehicle navigation system 100 continues to monitor and determine when a route deviation event occurs. When a route deviation event has occurred, the process 40 proceeds to step 420 in which the vehicle navigation system 100 determines whether or not an override is in place. If an override is in place, the process proceeds to step 422 which maintains the Reduced Audible Mode. If an override is not in place, the one or more processors 102 automatically switch the vehicle navigation system 100 from the Reduced Audible Mode to the Full Audible Mode at step 430. It is appreciated that the vehicle navigation system 100 can stay in the Full Audible Mode unless manually switched to the Reduced Audible Mode. In the alternative, the vehicle navigation system 100 can determine the vehicle is on a familiar route and the one or more processors 102 result in the vehicle navigation system 100 switching from the Full Audible Mode back to the Reduced Audible Mode, automatically.

It should now be understood that embodiments of the present disclosure are directed to vehicle navigation systems and methods that allow a driver of a vehicle to travel on familiar routes without having to listen to periodic audio driving information when such information is not needed or desired. In addition, the vehicle navigation systems and methods disclosed herein interrupt the Reduced Audible Mode when a route deviation event occurs and thus informs the driver that a wrong turn has been made, a turn has been missed, and/or an alternate route to the final destination location may be desired due to a traffic accident, construction, and/or congested traffic on the familiar route. In this manner, the driver can travel in their vehicle with the vehicle navigation system and talk with others in the vehicle, talk to others via a mobile phone, and/or listen to music in the vehicle without being interrupted by the periodic audible driving information that is not needed or desired. However, the driver is assured that in the event that a wrong turn has been taken, a turn has been missed, a traffic accident has occurred, construction is present, and/or traffic is congested on the familiar route that the vehicle navigation system will "speak up" and alert the driver of such a situation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of providing audible instructions to a driver of a vehicle, the method comprising:
  selecting a route on a vehicle navigation system from a start location to a destination location, the vehicle navigation system:
    determining if the selected route is a familiar route in response to the selected route having been traveled by the vehicle navigation system five or more times or the selected route having a distance of twenty or more miles on a single highway or an unfamiliar route in response to the selected route having been traveled by the vehicle navigation system less than five times or the selected route having a distance of less than twenty miles on the single highway;
    presenting a map image on a vehicle navigation system display, wherein the map image is indicative of the selected route;
    receiving geographic location data from a satellite module comprising a receiver, wherein the geographic location data is indicative of a geographic location of the vehicle;

executing a Reduced Audible Mode in response to the selected route being determined to be a familiar route or a Full Audible mode in response to the selected route being determined to be an unfamiliar route, the Reduced Audible Mode providing audible driving information at a preset first volume to the driver of the vehicle and the Full Audible Mode providing audible driving information at a preset second volume to the driver of the vehicle, the preset second volume being greater than the preset first volume.

2. The method of claim 1, further comprising switching from the Reduced Audible Mode to the Full Audible Mode, automatically, in response to a route deviation event being detected on the familiar route and in order to alert the driver of the route deviation event.

3. The method of claim 2, wherein the route deviation event is based on at least one of an unexpected route event, an incident event and a traffic flow event.

4. The method of claim 3, wherein the route deviation event is based on an unexpected route event, the unexpected route event being in response to the geographic location of the vehicle navigation system not being a location on the familiar route.

5. The method of claim 3, wherein the route deviation event is based on an incident event, the incident event being in response to at least one of a traffic accident event and a road construction event.

6. The method of claim 3, wherein the route deviation event is based on a traffic flow event, the traffic flow event being in response to a determination that an average speed of vehicles currently traveling at one or more sections of the familiar route is below a predetermined value.

7. A vehicle navigation system for a vehicle comprising:
one or more processors;
a vehicle navigation system display communicatively coupled to the one or more processors;
one or more audio speakers communicatively coupled to the one or more processors;
a satellite module comprising a receiver communicatively coupled to the one or more processors and configured to provide geographic location data to the one or more processors;
a non-transitory computer-readable medium storing computer-executable instructions that, when executed by the one or more processors, cause the vehicle navigation system to:
determine a route from a start location to a destination location;
determine if the determined route is a familiar route in response to the determined route having been traveled by the vehicle navigation system five or more times or the determined route having a distance of twenty or more miles on a single highway, or determine if the route is not a familiar route in response to the determined route having been traveled by the vehicle navigation system less than five times or the determined route having a distance of less than twenty miles on the single highway;
present a map image on the vehicle navigation system display, wherein the map image is indicative of the determined route;
receive the geographic location data from the satellite module, wherein the geographic location data is indicative of a geographic location of a vehicle associated with the vehicle navigation system; and
execute a Reduced Audible Mode in response to the route being determined to be a familiar route or a Full Audible mode in response to the route being determined to be an unfamiliar route, the Reduced Audible Mode configured to provide audible driving information at a preset first volume and the Full Audible Mode configured to provide audible driving information at a preset second volume, the preset second volume being greater than the preset first volume.

8. The vehicle navigation system of claim 7, wherein the computer-executable instructions further cause the vehicle navigation system to detect a route deviation event in response to a current geographic location of the vehicle navigation system not being a location on the familiar route and switch from the Reduced Audible Mode to the Full Audible Mode, automatically, in response the route deviation event being detected on the familiar route.

9. The vehicle navigation system of claim 7, further comprising one or more traffic data suppliers communicatively coupled to the one or more processors, wherein traffic data from the one or more traffic data suppliers is supplied to the one or more processors and the computer-executable instructions further cause the vehicle navigation system to:
determine if a route deviation event based on the traffic data is on the familiar route; and
switch from the Reduced Audible Mode to the Full Audible Mode, automatically, in response to the route deviation event being on the familiar route.

10. The vehicle navigation system of claim 9, wherein the route deviation event is based on at least one of an incident event and a traffic flow event.

11. The vehicle navigation system of claim 10, wherein the route deviation event is based on an incident event, the incident event being in response to at least one of a traffic accident event and a road construction event.

12. The vehicle navigation system of claim 10, wherein the computer-executable instructions further cause the vehicle navigation system to determine a traffic flow event based on the traffic data supplied to the one or more processors, wherein the traffic flow event is in response to a determination from the traffic data that an average speed of vehicles currently traveling on one or more sections of the familiar route is below a predetermined value.

13. The vehicle navigation system of claim 12, wherein the determined average speed of vehicles currently traveling on one or more sections of the familiar route is below a predetermined percentage below a speed limit for the one or more sections of the familiar route.

14. The vehicle navigation system of claim 13, wherein the predetermined value is defined by a user of the vehicle.

15. A vehicle with a vehicle navigation system comprising:
one or more processors;
a vehicle navigation system display communicatively coupled to the one or more processors;
one or more audio speakers communicatively coupled to the one or more processors;
a satellite module comprising a receiver communicatively coupled to the one or more processors and configured to provide geographic location data to the one or more processors;
one or more traffic data suppliers communicatively coupled to the one or more processors, wherein traffic data is received from the one or more traffic data suppliers;

a non-transitory computer-readable medium storing computer-executable instructions that, when executed by the one or more processors, cause the vehicle navigation system to:
  determine a route from a start location to a destination location;
  determine if the determined route is a familiar route in response to the determined route having been traveled by the vehicle navigation system five or more times or the determined route having a distance of twenty or more miles on a single highway or not a familiar route in response to the determined route having been traveled by the vehicle navigation system less than five times or the determined route having a distance of less than twenty miles on the single highway;
  present a map image on the vehicle navigation system display in response to the determined route, wherein the map image is indicative of the route;
  receive the geographic location data from the satellite module, wherein the geographic location data is indicative of a geographic location of a vehicle associated with the vehicle navigation system;
  execute a Reduced Audible Mode, automatically, in response to the determined route being determined to be a familiar route, the Reduced Audible Mode configured to provide audible driving information at a preset first volume;
  execute a Full Audible Mode, automatically, in response to the determined route being determined not to be a familiar route, the Full Audible Mode configured to provide audible driving information at a preset second volume, the preset second volume being greater than the preset first volume;
  determine if a route deviation event is on the familiar route based on the traffic data received from the one or more traffic data suppliers; and
  execute a switch from the Reduced Audible Mode to the Full Audible Mode, automatically, in response to the route deviation event being on the familiar route.

16. The vehicle claim 15, wherein the route deviation event is based on at least one of an incident event and a traffic flow event.

17. The vehicle of claim 16, wherein the route deviation event is based on an incident event, the incident event being in response to at least one of a traffic accident event and a road construction event.

18. The vehicle of claim 15, wherein the computer-executable instructions further cause the vehicle navigation system to determine a traffic flow event based on the traffic data supplied to the one or more processors, wherein the traffic flow event is in response to a determination form the traffic data that an average speed of vehicles currently traveling on one or more sections of the familiar route is below a predetermined value.

19. The vehicle of claim 18, wherein the determined average speed of vehicles currently traveling on one or more sections of the familiar route is below a predetermined percentage below a speed limit for the one or more sections of the familiar route.

* * * * *